United States Patent
Kolb et al.

(10) Patent No.: US 9,012,578 B2
(45) Date of Patent: Apr. 21, 2015

(54) BLOCKY ETHYLENE PROPYLENE COPOLYMERS AND METHODS FOR MAKING THEM

(71) Applicant: ExxonMobil Chemical Patents Inc., Baytown, TX (US)

(72) Inventors: Rainer Kolb, Kingwood, TX (US); Donna J. Crowther, Seabrook, TX (US); Peijun Jiang, League City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 37 days.

(21) Appl. No.: 13/797,490

(22) Filed: Mar. 12, 2013

(65) Prior Publication Data

US 2013/0281641 A1 Oct. 24, 2013

Related U.S. Application Data

(60) Provisional application No. 61/635,633, filed on Apr. 19, 2012, provisional application No. 61/635,650, filed on Apr. 19, 2012.

(51) Int. Cl.
| | |
|---|---|
| C08F 4/643 | (2006.01) |
| C08F 4/6592 | (2006.01) |
| C08F 210/02 | (2006.01) |
| C08F 210/06 | (2006.01) |
| C08F 4/659 | (2006.01) |
| C10M 143/04 | (2006.01) |
| C08F 4/76 | (2006.01) |
| C08F 210/16 | (2006.01) |
| C10M 143/00 | (2006.01) |

(52) U.S. Cl.
CPC .......... *C08F 4/65908* (2013.01); *C10M 143/04* (2013.01); *C08F 4/6592* (2013.01); *C08F 4/65927* (2013.01); *C08F 210/02* (2013.01); *C08F 4/76* (2013.01); *C08F 210/06* (2013.01); *C08F 210/16* (2013.01); *C10N 2230/68* (2013.01); *C10N 2240/04* (2013.01); *C10N 2240/042* (2013.01); *C10N 2240/08* (2013.01); *C10N 2270/02* (2013.01); *C10M 143/00* (2013.01); *C10M 2205/022* (2013.01); *C10N 2230/70* (2013.01); *C10N 2240/102* (2013.01); *C10N 2240/103* (2013.01); *C10N 2240/104* (2013.01)

(58) Field of Classification Search
CPC ............... C08F 4/65908; C08F 4/6592; C08F 4/65927; C08F 210/02; C08F 210/06; C08F 210/046; C10M 143/02; C10M 143/04
USPC .......... 526/133, 134, 160, 348, 943; 502/103, 502/152
See application file for complete search history.

(56) References Cited

U.S. PATENT DOCUMENTS

| | | | |
|---|---|---|---|
| 4,892,851 | A | 1/1990 | Ewen et al. |
| 5,017,714 | A | 5/1991 | Welborn, Jr. |
| 5,132,281 | A | 7/1992 | Chevallier et al. |
| 5,155,080 | A | 10/1992 | Elder et al. |
| 5,278,264 | A | 1/1994 | Spaleck et al. |
| 5,296,434 | A | 3/1994 | Karl et al. |
| 5,318,935 | A | 6/1994 | Canich et al. |
| 5,447,895 | A | 9/1995 | Marks et al. |
| 5,969,070 | A | 10/1999 | Waymouth et al. |
| 6,110,880 | A | 8/2000 | Verstrate et al. |
| 6,376,409 | B1 | 4/2002 | Burkhardt et al. |
| 6,376,412 | B1 | 4/2002 | Burkhardt et al. |
| 6,380,120 | B1 | 4/2002 | Burkhardt et al. |
| 2010/0029871 | A1* | 2/2010 | Crowther et al. ............. 526/126 |

FOREIGN PATENT DOCUMENTS

| | | |
|---|---|---|
| EP | 0 277 003 | 8/1988 |
| EP | 0 277 004 | 8/1988 |
| EP | 0 577 581 | 1/1994 |
| EP | 0 578 838 | 1/1994 |
| WO | WO 93/19103 | 9/1993 |
| WO | WO 99/07788 | 2/1999 |
| WO | WO 99/29743 | 6/1999 |
| WO | WO 01/48034 | 7/2001 |
| WO | WO 03/040201 | 5/2003 |
| WO | WO 2009/012152 | 1/2009 |
| WO | WO 2009/012153 | 1/2009 |
| WO | WO 2009/012214 | 1/2009 |
| WO | WO 2009/012216 | 1/2009 |
| WO | WO 2010/014344 | 2/2010 |

OTHER PUBLICATIONS

Spaleck, W., et al., "The Influence of Aromatic Substituents on the Polymerization Behavior of Bridged Zirconocene Catalysts", Organometallics 1994, vol. 13, No. 3, pp. 954-963.
Stehling, U., et al., "ansa-Zirconocene Polymerization Catalysts with Annelated Ring Ligands-Effects on Catalytic Activity and Polymer Chain Length", Organometallics 1994, vol. 13, No. 3, pp. 964-970.

* cited by examiner

*Primary Examiner* — Caixia Lu (57) ABSTRACT

Copolymers comprising ethylene and propylene and methods for producing such polymers are provided. The polymers are blocky copolymers having semicrystalline ethylene sequences and amorphous or low crystallinity propylene sequences. The polymers are preferably prepared using metallocene-based catalyst systems but without the use of a chain shuttling agent. The polymers may have higher melting temperatures than previously known random copolymers or blocky copolymers prepared with chain shuttling agents having similar comonomer contents. The polymers include both ethylene-rich and propylene-rich copolymers.

6 Claims, 2 Drawing Sheets

Fig. 1

BLOCKY ETHYLENE PROPYLENE COPOLYMERS AND METHODS FOR MAKING THEM

PRIORITY CLAIM

This application claims the benefit of and priority to U.S. Provisional Application Nos. 61/635,650 and 61/635,633, both filed on Apr. 19, 2012, the disclosures of which are incorporated herein by reference in their entireties.

FIELD OF THE INVENTION

The present invention is directed to copolymers comprising ethylene and propylene and to methods for producing such polymers. In particular, the polymers are blocky copolymers having semicrystalline ethylene sequences and amorphous or low crystallinity propylene sequences. The polymers are preferably prepared using metallocene-based catalyst systems but without the use of a chain shuttling agent. The polymers of the invention have higher melting temperatures than previously known random copolymers or blocky copolymers having similar comonomer contents and prepared with chain shuttling agents. Polymers according to the present invention include both ethylene-rich and propylene-rich copolymers.

BACKGROUND OF THE INVENTION

Polymers comprising ethylene and propylene are well known in the art and are used in many applications. Such polymers include random, block, and alternating copolymers prepared from a variety of catalysts and catalyst systems and in a variety of polymerization processes.

Ethylene/α-olefin block interpolymers are described in PCT Publication No. WO2009/012216. The polymers are said to be prepared using two catalysts having differing comonomer incorporation indices and a chain shuttling agent. The polymers are said to have melting temperatures as high as 100° C., with reported melting temperatures for exemplary polymers as high as about 74° C. Block interpolymers are also described in PCT Publication Nos. WO2009/012214, WO2009/012152, and WO2009/012153.

It would be desirable to produce blocky copolymers of ethylene and propylene having similar or superior properties to those previously described but which can be produced without the added complexity and cost of a chain shuttling agent. The present invention addresses this by providing copolymers comprising ethylene and propylene and having semicrystalline ethylene sequences and amorphous or low crystallinity propylene sequences. The polymers are preferably prepared using metallocene-based catalyst systems but without the use of a chain shuttling agent. The polymers have higher melting temperatures than previously known random copolymers or blocky copolymers having similar comonomer contents and which are prepared with chain shuttling agents.

SUMMARY OF THE INVENTION

The present invention is directed to copolymers comprising ethylene and propylene ("EP copolymers") and to methods for producing such polymers. The EP copolymers may comprise ethylene and propylene, wherein the copolymer comprises from about 50 to about 95 wt. % ethylene derived units, and where the copolymer has a melting temperature greater than about 90° C., and more than about 5 wt. % of the copolymer, based upon the total weight of the copolymer, is soluble in xylene or ortho-dichlorobenzene (ODCB).

EP copolymers are also provided that comprise ethylene and propylene, wherein the copolymer comprises from about 5 to about 25 wt. % ethylene, the copolymer has a melting temperature less than about 110° C., the copolymer has a heat of fusion less than about 65 J/g, and more than about 5 wt. % of the copolymer, based upon the total weight of the copolymer, is soluble in xylene or ODCB.

Processes for preparing such EP polymers are also provided. The process may comprise polymerizing ethylene and propylene in a solution process and in the presence of a catalyst system comprising a catalyst and an activator where the catalyst comprises a metallocene compound, and the activator comprises a cationic component and an anionic component. The cationic component of the activator corresponds to either formula (1A) or formula (2A):

$$[R_1R_2R_3NH]^+, \quad (1A)$$

where $R_1$ and $R_2$ are together a $-(CH_2)_a-$ group, where a is 3, 4, 5, or 6 and $R_1$ and $R_2$ form a 4-, 5-, 6-, or 7-membered non-aromatic ring together with the nitrogen atom to which one or more aromatic or heteroaromatic rings may optionally be fused via adjacent ring carbon atoms; and $R_3$ is a $C_1$-$C_5$ alkyl group; or $$[R_3NH]^+, \quad (2A)$$

where all R are identical and are $C_1$-$C_3$ alkyl groups. The anionic component of the activator corresponds to formula (3):

$$[B(R_4)_4]^-, \quad (3)$$

where $R_4$ is an aryl group or a substituted aryl group having one or more substituents, wherein the one or more substituents are identical or different and are selected from alkyl, aryl, halogenated aryl, haloalkylaryl groups, or a hydrogen atom.

The blocky EP copolymers described herein are prepared without the use of a chain shuttling agent. The EP copolymers may have melting temperatures that are at least about 10° C., or at least about 20° C., greater than those of both random copolymers and of block copolymers prepared with chain shuttling agents that comprise propylene and ethylene in the same amounts.

DEFINITIONS

As used herein, the term "copolymer" includes polymers having two or more monomers, optionally with other monomers, and may refer to interpolymers, terpolymers, etc. "EP copolymer," as used herein, refers to polymers comprising ethylene-derived and propylene-derived units. The term "polymer" as used herein includes, but is not limited to, homopolymers, copolymers, terpolymers, etc., and alloys and blends thereof. The term "polymer" as used herein also includes impact, block, graft, random and alternating copolymers. The term "polymer" shall further include all possible geometrical configurations unless otherwise specifically stated. Such configurations may include isotactic, syndiotactic and random symmetries.

As used herein, the term "monomer" or "comonomer" refers to the monomer used to form the polymer, i.e., the unreacted chemical compound in the form prior to polymerization, and can also refer to the monomer after it has been incorporated into the polymer, also referred to herein as a "[monomer]-derived unit", which by virtue of the polymerization reaction typically has fewer hydrogen atoms than it does prior to the polymerization reaction. Different monomers are discussed herein, including propylene monomers, ethylene monomers, and other α-olefin monomers. For the purposes of this invention, it is understood that whenever a polymer is referred to as "comprising" an olefin or other monomer, the olefin present in the polymer is the polymerized form of the olefin or other monomer, respectively.

As used herein, "ethylene-rich" or "ethylene-based" refers to polymers comprising greater than 50 wt. % units derived from ethylene.

As used herein, "propylene-rich" or "propylene-based" refers to polymers comprising greater than 50 wt. % units derived from propylene.

As used herein, "block" or "blocky" when used to describe copolymers refers to copolymers having statistically significant sequences of the same repeating monomer units. Block (or blocky) copolymers described herein are distinguished from random polymers, i.e., those having random statistical distribution of monomer units. In block copolymers, the average length of sequences of the same repeating monomer unit is greater than in a random copolymer with a similar composition. Within the context of the invention, the term "sequence" describes a number of contiguous olefin monomer residues catenated together by chemical bonds and obtained by a polymerization procedure. Whereas random copolymers often have properties, such as melting temperatures or glass transition temperatures, that are an average of the properties of the homopolymers comprising the copolymer, block copolymers often retain the characteristics of the corresponding homopolymers in each block.

As used herein, a "catalyst system" is a combination of different components that, taken together, provide the active catalyst. A catalyst system may therefore comprise at least a transition metal compound (also referred to herein as "catalyst," "precatalyst," or "catalyst precursor," these terms being identical in meaning and used interchangeably herein) and an activator. An activator is also sometimes referred to as a "co-catalyst" (these terms are again identical in meaning and used interchangeably herein). The activator activates the transition metal compound and converts it into its catalytically active form. For example, an activator converts a neutral metallocene compound into its cationic form, which is the catalytically active species. When the term "catalyst system" is used to describe a catalyst/activator pair before activation, it refers to the unactivated catalyst (i.e., the precatalyst) together with an activator. When this term is used to describe a catalyst/activator pair after activation, it refers to the activated catalyst and the charge-balancing anion derived from the activator or other charge-balancing moiety. In the scientific and commercial literature the term "catalyst" is sometimes used to refer to the non-activated (i.e., neutral and stable) metallocene, which still has to be converted to its respective charged form in order to react with the monomers to produce polymer. The components of the catalyst system may, either separately or jointly, be supported on a solid support, such as alumina or silica.

A "scavenger" is a compound that is typically added to facilitate polymerization by scavenging impurities (poisons that would otherwise react with the catalyst and deactivate it). Some scavengers may also act as activators, and they may also be referred to as co-activators. A co-activator may be used in conjunction with an activator in order to form an active catalyst.

The terms "radical," "group," and "substituent" are used interchangeably herein and indicate a group that is bound to a certain atom as indicated herein. A "substituted" group is one in which a hydrogen has been replaced by a hydrocarbyl, a heteroatom or a heteroatom containing group. For example, methyl cyclopentadiene is a cyclopentadiene substituted with a methyl group.

The term "hydrocarbyl" is used herein to refer to any hydrocarbon-derived substituent or group and thus is understood to include, without limitation, linear, branched or cyclic alkyl, alkylene, alkene, alkyne, as well as aryl groups. Any of these groups may be substituted or unsubstituted.

The term "alkyl" is used herein to refer to an aliphatic, branched or linear, non-cyclic or cyclic substituent typically with a certain number of carbon atoms as individually specified. Unless specified otherwise herein, "alkyl" specifically includes aliphatic groups having from 1 to 20, or from 1 to 10, or from 1 to 5 carbon atoms, and specifically methyl, ethyl, propyl, n-propyl, isopropyl, butyl, n-butyl, isobutyl, pentyl, n-pentyl, isopentyl, cyclopentyl, hexyl, n-hexyl, isohexyl, cyclohexyl, heptyl, n-heptyl, isohexyl, cycloheptyl, octyl, n-octyl, isooctyl, cyclooctyl, nonyl, n-nonyl, isononyl, decyl, n-decyl, iso-decyl and the like. The same definition applies for the alkyl in an alkoxy substituent.

The term "aryl" is used herein to refer to an aromatic substituent, which may be a single aromatic ring or multiple aromatic rings, which are fused together, covalently linked, or linked to a common group such as a methylene or ethylene moiety. The common linking group may also be a carbonyl as in benzophenone or oxygen as in diphenylether. The aromatic ring(s) may include phenyl, naphthyl, fluorenyl, indenyl, biphenyl, diphenylether, tolyl, cumyl, xylyl, and benzophenone, among others. Unless specified otherwise herein, the term "aryl" specifically includes those having from 5 to 30, or from 5 to 25, or from 5 to 20, or from 5 to 15 carbon atoms, alternately the aryl may have 6 to 15 carbon atoms or may have 5 or 6 carbon atoms. "Substituted aryl" refers to aryl as just described in which one or more hydrogen atoms to any carbon are, independently of each other, replaced by one or more groups such as alkyl, substituted alkyl, cycloalkyl, substituted cycloalkyl, heterocycloalkyl, substituted heterocycloalkyl, halogen, alkylhalogen, such as hydroxyl-, phosphino-, alkoxy-, aryloxy-, amino-, thio- and both saturated and unsaturated cyclic hydrocarbons which are fused to the aromatic ring(s), linked covalently or linked to a common group such as a methylene or ethylene moiety. The linking group may also be a carbonyl such as in cyclohexyl phenyl ketone. The term "aryl" also includes aromatic groups containing one or more heteroatoms, such as nitrogen, oxygen, phosphorus or sulfur. Non-limiting examples of such heteroatom containing aromatic groups are furanyl, thiophenyl, pyridinyl, pyrrolyl, imidazolyl, pyrazolyl, benzofuranyl, pyrazinyl, pyrimidinyl, pyridazinyl, chinazolinyl, indolyl, carbazolyl, oxazolyl, thiazolyl, and the like.

The term "ring system" refers to any system or combination of aliphatic and/or aromatic rings that are fused to each other via shared ring member atoms, that are covalently linked to each other, or that are linked via a common linking group, such as an alkylene group or a hetero-atom containing group such as carbonyl. One or more of the aliphatic and/or aromatic rings of the ring system may also contain one or more heteroatoms, such as nitrogen, oxygen, phosphorus or sulfur. Any of the aliphatic and/or aromatic rings of the ring system may be substituted by one or more groups such as alkyl, substituted alkyl, cycloalkyl, substituted cycloalkyl, heterocycloalkyl, substituted heterocycloalkyl, halogen, alkylhalogen, such as hydroxyl-, phosphino-, alkoxy-, aryloxy-, amino-, thio- and both saturated and unsaturated cyclic hydrocarbons. For the aromatic or aliphatic rings of the ring system, the above-provided definitions for "aryl" and "alkyl" regarding the number of carbon atoms apply as well. A ring system in the context of the present invention contains at least two rings. A "ring carbon atom" is a carbon atom that is part of a cyclic ring structure. By this definition, a benzyl group has six ring carbon atoms and para-methylstyrene also has six ring carbon atoms.

The term "amino" is used herein to refer to the group —$NQ^1Q^2$, where each of $Q^1$ and $Q^2$ is independently selected from the group consisting of hydrogen, alkyl, substituted alkyl, cycloalkyl, substituted cycloalkyl, heterocycloalkyl, substituted heterocycloalkyl, aryl, substituted aryl, heteroaryl, substituted heteroaryl, alkoxy, aryloxy, silyl and combinations thereof.

As used herein, the numbering scheme for the Periodic Table Groups is as published in Chemical and Engineering News, 63(5), 27 (1985).

DETAILED DESCRIPTION OF THE INVENTION

The present invention is directed to copolymers comprising ethylene and propylene ("EP copolymers") and to methods for producing such polymers. In particular, the polymers are blocky EP copolymers having semicrystalline ethylene sequences and amorphous or low crystallinity propylene sequences. The EP copolymers are preferably prepared using metallocene-based catalyst systems but without the use of a chain shuttling agent. The EP copolymers have higher melting temperatures than previously known random copolymers or blocky copolymers having similar comonomer contents and prepared with chain shuttling agents. The EP copolymers may include both ethylene-rich and propylene-rich copolymers.

The presence of blocky characteristics in the polymers of the invention can be shown by their high melting temperature when compared to random copolymers having the same comonomer composition. Further indication of blockiness can be found in the poor solubility of the polymers in multiple solvents, including xylene and ortho-dichlorobenzene (ODCB).

Test Methods

The following test methods are used to determine the properties reported herein.

Gel Permeation Chromatography (GPC)—Techniques for determining the molecular weight (Mn, Mw and Mz) and MWD may be found in U.S. Pat. No. 4,540,753 (Cozewith, Ju and Verstrate), incorporated by reference herein, and references cited therein, and in Macromolecules, 1988, Vol. 21, p. 3360 (Verstrate et al.), which is incorporated by reference herein, and references cited therein. For example, molecular weight may be determined by size exclusion chromatography (SEC) by using a Waters 150 gel permeation chromatograph equipped with the differential refractive index detector and calibrated using polystyrene standards.

Differential Scanning calorimetry (DSC)—DSC procedures for determining peak melting temperature (Tm), crystallization temperature (Tc), and heat of fusion (Hf) include the following. The polymer is pressed at a temperature of from about 200° C. to about 230° C. in a heated press, and the resulting polymer sheet is hung, under ambient conditions, in the air to cool at room temperature (approximately 23° C.). About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −70° C. The sample is heated at 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0° C. and about 200° C. It is measured in Joules and is a measure of the Hf of the polymer.

Comonomer Content—The ethylene content of ethylene/propylene copolymers can be determined using FTIR according to the following technique. A thin homogeneous film of polymer, pressed at a temperature of about 150° C., was mounted on a Perkin Elmer Spectrum 2000 infrared spectrophotometer. A full spectrum of the sample from 600 $cm^{-1}$ to 4000 $cm^{-1}$ was recorded and the area under the propylene band at ~1165 $cm^{-1}$ and the area under the ethylene band at ~732 $cm^{-1}$ in the spectrum were calculated. The baseline integration range for the methylene rocking band is nominally from 695 $cm^{-1}$ to the minimum between 745 and 775 $cm^{-1}$. For the polypropylene band the baseline and integration range is nominally from 1195 to 1126 $cm^{-1}$. The ethylene content in wt. % was calculated according to the following equation:

$$\text{ethylene content(wt. \%)}=72.698-86.495X+13.696X^2,$$

where X=AR/(AR+1) and AR is the ratio of the area for the peak at ~1165 $cm^{-1}$ to the area of the peak at ~732 $cm^{-1}$.

Temperature Rising Elution Fractionation (TREF)—The TREF data reported herein were measured using an analytical size TREF instrument (Polymerchar, Spain), with a column of the following dimensions: inner diameter (ID) 7.8 mm, outer diameter (OD) 9.53 mm, and column length of 150 mm. The column was filled with steel beads. 0.5 mL of a 4 mg/mL polymer solution in orthodichlorobenzene (ODCB) containing 2 g butylated hydroxyl toluene (BHT)/4 L were charged onto a the column and cooled from 140° C. to −15° C. at a constant cooling rate of 1.0° C./min. Subsequently, ODCB was pumped through the column at a flow rate of 1.0 mL/min, and the column temperature was increased at a constant heating rate of 2° C./min to elute the polymer. The polymer concentration in the eluted liquid was detected by means of measuring the absorption at a wavenumber of 2941 $cm^{-1}$ using an infrared detector. The concentration of the ethylene-α-olefin copolymer in the eluted liquid was calculated from the absorption and plotted as a function of temperature.

Fractionation—Copolymers were fractionated using the TREF method described above. In order to obtain individual fractions in sufficient quantity for additional analysis, solvent with polymer eluting at the following three temperature ranges was collected: −15° C. to 0° C.; >0° C. to +10° C.; and >+10° C. to 130° C. The solvent was evaporated and the dried polymers collected at these ranges were further analyzed by DSC for thermal properties and by IR spectroscopy for ethylene content.

Ethylene-Rich Blocky Copolymers

Provided herein are copolymers comprising propylene and ethylene, wherein the copolymer comprises from about 50 to about 95 wt. % ethylene, the copolymer has a melting temperature greater than about 90° C., and more than about 5 wt. % of the copolymer, based upon the total weight of the copolymer, is soluble in xylene or ortho-dichlorobenzene.

The ethylene-rich copolymers may comprise from about 50 to about 95 wt. %, or from about 52 to about 93 wt. %, or from about 55 to about 90 wt. %, or from about 57 to about 87 wt. %, or from about 60 to about 85 wt. %, or from about 65 to about 85 wt. %, or from about 70 to about 85 wt. %, or from about 75 to about 85 wt. % ethylene.

The ethylene-rich copolymers may have a melting temperature of from about 90° C. to about 200° C., or from about 95° C. to about 200° C., or from about 100° C. to about 180° C., or from about 105° C. to about 180° C., or from about 110° C. to about 180° C., or from about 112° C. to about 160° C., or from about 114° C. to about 160° C., or from about 115° C. to about 160° C.

The ethylene-rich copolymers may have a weight-average molecular weight (Mw) in g/mol, determined using GPC, of from about 10,000 to about 500,000, or from about 25,000 to about 125,000, or from about 40,000 to about 115,000, or from about 45,000 to about 110,000, or from about 50,000 to about 100,000, or from about 50,000 to about 80,000.

The ethylene-rich copolymers may have a number-average molecular weight (Mn) in g/mol, determined using GPC, from about 4,000 to about 40,000, or from about 5,000 to about 35,000, or from about 6,000 to about 30,000, or from about 7,000 to about 30,000, or from about 8,000 to about 30,000, or from about 10,000 to about 30,000, or from about 12,000 to about 28,000.

The ethylene-rich copolymers may have a z-average molecular weight (Mz) in g/mol, determined using GPC, from about 50,000 to about 300,000, or from about 75,000 to about 275,000, or from about 100,000 to about 250,000, or from about 110,000 to about 225,000, or from about 115,000 to about 200,000, or from about 115,000 to about 175,000.

The ethylene-rich copolymers may have a molecular weight distribution (MWD), Mw/Mn, from about 2.0 to about 10.0, or from about 2.0 to about 9.0, or from about 2.0 to about 8.0, or from about 2.5 to about 7.0, or from about 2.5 to about 6.5, or from about 2.5 to about 6.0, or from about 2.0 to about 5.0, or from about 2.5 to about 5.0.

The ethylene-rich copolymers may have a density in the range of from 0.85 g/cc to 0.97 g/cc, or in the range of from 0.86 g/cc to 0.94 g/cc, or in the range of from 0.86 g/cc to 0.91 g/cc, or in the range of from 0.86 g/cc to 0.90 g/cc.

The fraction of the ethylene-rich copolymer that is soluble in xylene or ODCB is more than about 15 wt. %, or more than about 10 wt. %, or more than about 7.5 wt. %, or more than about 5 wt. %, or more than about 4 wt. %, or more than about 3 wt. %. The melting temperature of the soluble fraction may be greater than about 90° C., or greater than about 95° C., or greater than about 100° C., or greater than about 105° C., or greater than about 110° C., or greater than about 115° C.

The melting temperature of the ethylene-rich copolymers may be at least about 5° C., or at least about 10° C., or at least about 15° C., or at least about 20° C., or at least about 25° C. greater than that of a random copolymer having the same comonomer composition. In some embodiments, the melting temperature of the copolymers may also be at least about 5° C., or at least about 10° C., or at least about 15° C., or at least about 20° C., or at least about 25° C. greater than that of a blocky copolymer having the same comonomer composition but synthesized in the presence of a chain shuttling agent. Additionally, the melting temperature of the soluble fraction of the copolymers may be at least about 5° C., or at least about 10° C., or at least about 15° C., or at least about 20° C., or at least about 25° C. greater than that of the soluble fraction of a blocky copolymer having the same or similar comonomer composition but synthesized in the presence of a chain shuttling agent. Chain shuttling agents are described in, e.g., U.S. Publication Nos. 2007/0167578 and 2008/0311812.

Propylene-Rich Blocky Copolymers

Also provided herein are copolymers comprising propylene and ethylene, wherein the copolymer comprises from about 5 to about 25 wt. % ethylene, and from about 95 to 75% propylene, the copolymer has a melting temperature less than about 110° C., the copolymer has a heat of fusion less than about 65 J/g, and more than about 5 wt. % of the copolymer, based upon the total weight of the copolymer, is soluble in xylene or ortho-dichlorobenzene (ODCB).

The propylene-rich copolymer may comprise from about 2 to about 30 wt. %, or from about 2.5 to about 28 wt. %, or from about 4 to about 25 wt. %, or from about 5 to about 25 wt. %, or from about 5 to about 20 wt. %, or from about 5 to about 18 wt. %, or from about 8 to about 20 wt. % ethylene.

The propylene-rich copolymer may have a melting temperature less than about 125° C., or less than about 120° C., or less than about 115° C., or less than about 110° C., or less than about 105° C., or less than about 103° C., or less than about 100° C., or less than about 95° C., or less than about 90° C.

In some embodiments, the melting temperature of the propylene-rich copolymers may be at least about 2° C., or at least about 5° C., or at least about 7° C., or at least about 10° C., or at least about 15° C., or at least about 20° C. greater than that of a random copolymer having the same or similar comonomer composition. Similarly, the melting temperature of the copolymers may also be at least about 2° C., or at least about 5° C., or at least about 7° C., or at least about 10° C., or at least about 15° C., or at least about 20° C. greater than that of a blocky copolymer having the same comonomer composition but synthesized in the presence of a chain shuttling agent.

The propylene-rich copolymer may have a heat of fusion (Hf) of less than about 75 J/g, or less than about 70 J/g, or less than about 65 J/g, or less than about 60 J/g, or less than about 58 J/g, or less than about 55 J/g, or less than about 50 J/g, or less than about 45 J/g.

The propylene-rich copolymers generally have a density in the range of from 0.85 g/cc to 0.97 g/cc, or in the range of from 0.86 g/cc to 0.94 g/cc, or in the range of from 0.86 g/cc to 0.91 g/cc, or in the range of from 0.86 g/cc to 0.90 g/cc.

The fraction of the propylene-rich copolymer that is soluble in xylene or ODCB may be more than about 15 wt. %, or more than about 10 wt. %, or more than about 7.5 wt. %, or more than about 5 wt. %, or more than about 4 wt. %, or more than about 3 wt. %. The melting temperature of the soluble fraction may be less than about 125° C., or less than about 120° C., or less than about 115° C., or less than about 110° C., or less than about 105° C., or less than about 103° C., or less than about 100° C., or less than about 95° C., or less than about 90° C. In some embodiments, the melting temperature of the soluble fraction of the copolymers may be at least about 2° C., or at least about 5° C., or at least about 7° C., or at least about 10° C., or at least about 15° C., or at least about 20° C. greater than that of the soluble fraction of a blocky copolymer having the same comonomer composition but synthesized in the presence of a chain shuttling agent.

Processes for Preparing Blocky EP Copolymers

Processes for preparing the above described copolymers are also provided. Such processes may comprise polymerizing propylene and ethylene in a solution process and in the presence of a catalyst system comprising a catalyst and an activator where the catalyst comprises a metallocene compound as described in further detail below, and the activator comprises a cationic component and an anionic component, each also described in further detail below. In one or more embodiments, the copolymers of the present invention are prepared without the use of a chain shuttling agent.

The cationic component of the activator may correspond to either formula (1) or formula (2):
(1) $[R_1R_2R_3NH]^+$, where $R_1$ and $R_2$ are together a —$(CH_2)_a$— group, where a is 3, 4, 5, or 6 and $R_1$ and $R_2$ form a 4-, 5-, 6-, or 7-membered non-aromatic ring together with the nitrogen atom to which one or more aromatic or heteroaromatic rings may optionally be fused via adjacent ring carbon atoms; and $R_3$ is a $C_1$-$C_5$ alkyl group; or
(2) $[R_3NH]^+$, where all R are identical and are $C_1$-$C_3$ alkyl groups.

The anionic component of the activator may correspond to formula (3):
(3) $[B(R_4)_4]^-$, where $R_4$ is an aryl group or a substituted aryl group having one or more substituents, wherein the one or more substituents are identical or different and are selected from alkyl, aryl, halogenated aryl, or haloalkylaryl groups or a hydrogen atom. Such components are further described in U.S. Pat. No. 7,985,816.

Transition Metal Compounds

Any transition metal compound capable of catalyzing a reaction, such as a polymerization reaction, upon activation of an activator as described herein, is suitable for use in the present invention. Transition metal compounds known as metallocenes are preferred compounds according to the present invention. Useful metallocene compounds are described in greater detail in U.S. Publication No. 2010/0029873, which is incorporated herein by reference in its entirety.

Preferably, the transition metal compound is represented by the formula: $T(L_1)(L_2)M(X_1)(X_2)$, wherein the metal (M) is a Group 4 metal, specifically, titanium, zirconium, or hafnium, and the indenyl (L) is unsubstituted or may be substituted by one or more substituents selected from the group consisting of a halogen atom, $C_1$ to $C_{10}$ alkyl, $C_5$ to $C_{15}$ aryl, $C_6$ to $C_{25}$ arylalkyl, and $C_6$ to $C_{25}$ alkylaryl. More preferably, the metal is zirconium or hafnium, $L_1$ and $L_2$ are unsubstituted or substituted indenyl radicals, T may be dialkylsiladiyl, and $X_1$ and $X_2$ are both halogen or $C_1$ to $C_3$ alkyl. Preferably, these compounds are in the rac-form. In the formula above, T is bound to $L_1$ and $L_2$; $L_1$ and $L_2$ are each bound to M to form a cyclic structure; and $X_1$ and $X_2$ are each bound to M. Preferably the transition metal compound is a dimethylsilylbis(indenyl) metallocene where $X_1$ and $X_3$ are both halogen or a $C_1$ to $C_3$ alkyl.

Illustrative, but not limiting examples of preferred stereospecific metallocene compounds are the racemic isomers of dimethylsilylbis(indenyl) metal dichloride, -diethyl or -dimethyl, wherein the metal is titanium, zirconium or hafnium, preferably hafnium or zirconium. It is particularly preferred that the indenyl radicals are not substituted by any further substituents. The two indenyl groups may be, independently of each other, indenyl, 2-methyl-4-phenylindenyl; 2-methyl indenyl; 2-methyl,4-[3',5'-di-t-butylphenyl]indenyl; 2-ethyl-4-[3',5'-di-t-butylphenyl]indenyl; 2-n-propyl-4-[3',5'-di-t-butylphenyl]indenyl; 2-iso-propyl-4-[3',5'-di-t-butylphenyl]indenyl; 2-iso-butyl-4-[3',5'-di-t-butylphenyl]indenyl; 2-n-butyl-4-[3',5'-di-t-butylphenyl]indenyl; 2-sec-butyl-4-[3',5'-di-t-butylphenyl]indenyl; 2-methyl-4-[3',5'-di-phenylphenyl]indenyl; 2-ethyl-4-[3',5'-di-phenylphenyl]indenyl; 2-n-propyl-4-[3',5'-di-phenylphenyl]indenyl; 2-iso-propyl-4-[3',5'-di-phenylphenyl]indenyl; 2-n-butyl-4-[3',5'-di-phenylphenyl]indenyl; 2-sec-butyl-4-[3',5'-di-phenylphenyl]indenyl; 2-tert-butyl-4-[3',5'-di-phenylphenyl]indenyl; and the like. Further illustrative, but not limiting examples of preferred stereospecific metallocene compounds are the racemic isomers of 9-silafluorenylbis(indenyl) metal dichloride, -diethyl or -dimethyl, wherein the metal is titanium, zirconium or hafnium. Again, unsubstituted indenyl radicals are particularly preferred. In some embodiments, however the two indenyl groups may be replaced, independently of each other, by any of the substituted indenyl radicals listed above.

Particularly preferred metallocenes as transition metal compounds for use in the catalyst systems of the present invention together with the activators of formula (1) or (2) defined above for use in polymerizing olefins are rac-dimethylsilylbis(indenyl)hafnocenes or -zirconocenes, rac-dimethylsilylbis(2-methyl-4-phenylindenyl) hafnocenes or -zirconocenes, rac-dimethylsilylbis(2-methyl-indenyl) hafnocenes or -zirconocenes, and rac-dimethylsilylbis(2-methyl-4-naphthylindenyl)hafnocenes or -zirconocenes, wherein the hafnium and zirconium metal is substituted, in addition to the bridged bis(indenyl) substituent, by two further substituents, which are halogen, preferably chlorine or bromine atoms, or alkyl groups, preferably methyl and/or ethyl groups. Preferably, these additional substituents are both chlorine atoms or both methyl groups. Particularly preferred transition metal compounds are dimethylsilylbis(indenyl)hafnium dimethyl, rac-dimethylsilylbis(indenyl)zirconium dimethyl, rac-ethylnylbis(indenyl)zirconium dimethyl, and rac-ethylnylbis(indenyl)hafnium dimethyl.

Illustrative, but not limiting examples of preferred non-stereospecific metallocene catalysts are: [dimethylsilanediyl (tetramethylcyclopentadienyl)-(cyclododecylamido)]metal dihalide, [dimethylsilanediyl(tetramethylcyclopentadienyl) (t-butylamido)]metal dihalide, [dimethylsilanediyl(tetramethylcyclopentadienyl)(exo-2-norbornyl)]metal dihalide, wherein the metal is Zr, Hf, or Ti, preferably Ti, and the halide is preferably chlorine or bromine.

In preferred embodiments, the transition metal compound is a bridged or unbridged bis(substituted or unsubstituted indenyl)hafnium dialkyl or dihalide.

Activators and Activation Methods

The transition metal compounds described herein are activated to yield a catalytically active, cationic transition metal compound having a vacant coordination site to which a monomer will coordinate and then be inserted into the growing polymer chain. In the process for polymerizing the copolymers described herein, an activator of one of the following general formulas (1) or (2) may be used to activate the transition metal compound:

where $[Y]^-$ is a non-coordinating anion (NCA) as further illustrated below, A is nitrogen or phosphorus, $R^1$ and $R^2$ are hydrocarbyl groups or heteroatom-containing hydrocarbyl groups and together form a first, 3- to 10-membered non-aromatic ring with A, wherein any number of adjacent ring members may optionally be members of at least one second, aromatic or aliphatic ring or aliphatic and/or aromatic ring system of two or more rings, wherein said at least one second ring or ring system is fused to said first ring, and wherein any atom of the first and/or at least one second ring or ring system is a carbon atom or a heteroatom and may be substituted independently by one or more substituents selected from the group consisting of a hydrogen atom, halogen atom, $C_1$ to $C_{10}$ alkyl, $C_5$ to $C_{15}$ aryl, $C_6$ to $C_{25}$ arylalkyl, and $C_6$ to $C_{25}$ alkylaryl, and $R^3$ is a hydrogen atom or $C_1$ to $C_{10}$ alkyl, or $R^3$ is a $C_1$ to $C_{10}$ alkylene group that connects to said first ring and/or to said at least one second ring or ring system; or where $[Y]^-$ is a non-coordinating anion (NCA) as further illustrated below, A is nitrogen, phosphorus or oxygen, n is 3 if A is nitrogen or phosphorus, and n is 2 if A is oxygen, and the groups R are identical or different and are a $C_1$ to $C_3$ alkyl group.

Both the cation part of formulas (1) and (2) and the anion part, which is an NCA, are described in further detail in U.S. Publication No. 2010/0029873, which is incorporated by reference herein in its entirety. Any combinations of cations and NCAs disclosed therein are suitable to be used in the polymerization processes.

Preferred activators of formula (1) in the catalyst systems used in the polymerization processes of the present invention are those where A is nitrogen, $R^1$ and $R^2$ together are a —$(CH_2)_a$— group with A being 3, 4, 5, or 6, and $R^3$ is $C_1$, $C_2$, $C_3$, $C_4$ or $C_5$ alkyl, and $[Y]^-$ is $[B(R^4)_4]^-$, with $R^4$ being an aryl group or a substituted aryl group, of which the one or more substituents are identical or different and are selected from the group consisting of alkyl, aryl, a halogen atom, halogenated aryl, and haloalkylaryl groups, and preferably $R^4$ is a perhalogenated aryl group, more preferably a perfluorinated aryl group, more preferably pentafluorophenyl, heptafluoronaphthyl, or perfluorobiphenyl. Preferably, these activators are combined with a transition metal compound (such as a metallocene) to form the catalyst system.

Preferred activators in the catalyst systems of formula (2) in the catalyst systems used in the polymerization processes are those wherein A is nitrogen, n is 3, all groups R are identical and are methyl, ethyl or isopropyl, and $[Y]^-$ is $[B(R^4)_4]^-$, with $R^4$ being an aryl group or a substituted aryl group, of which the one or more substituents are identical or different and are selected from the group consisting of alkyl, aryl, a halogen atom, halogenated aryl, and haloalkylaryl groups, and preferably $R^4$ is a perhalogenated aryl group, more preferably a perfluorinated aryl group, more preferably pentafluorophenyl, heptafluoronaphthyl or perfluorobiphenyl. Preferably, these activators are combined with a transition metal compound (such as a metallocene) to form the catalyst system.

In the polymerization process, in addition to the preferred activators of formula (1) mentioned in the preceding paragraph also the activators of formula (2) wherein A is nitrogen and all groups R are identically methyl or ethyl, and wherein $[Y]^-$ is defined as in the preceding paragraph are preferably used. Again, these activators are preferably combined with a metallocene (e.g., as explained herein below) to form the catalyst systems used in the polymerization process.

Catalyst Systems

Preferred combinations of transition metal compound and activator in the catalyst systems for olefin polymerization comprise a metallocene compound and an activator comprising a cationic component and an anionic component. In one or more embodiments, the metallocene compound is preferably a dialkylsilyl-bridged bis(indenyl) metallocene, wherein the metal is a group 4 metal and the indenyl is unsubstituted, or if substituted, is substituted by one or more substituents selected from the group consisting of a $C_1$ to $C_{10}$ alkyl, $C_5$ to $C_{15}$ aryl, $C_6$ to $C_{25}$ arylalkyl, and $C_6$ to $C_{25}$ alkylaryl; more preferably dimethylsilylbis(indenyl) metal dichloride or -dimethyl, ethylenylbis(indenyl) metal dichloride or -dimethyl, dimethylsilylbis(2-methyl-4-phenylindenyl) metal dichloride or -dimethyl, dimethylsilylbis(2-methyl-indenyl) metal dichloride or -dimethyl, and dimethylsilylbis(2-methyl-4-naphthylindenyl) metal dichloride or -dimethyl, wherein in all cases the metal may be zirconium or hafnium.

In one or more embodiments, the cationic component is of the formula $[R^1R^2R^3AH]^+$, where preferably A is nitrogen, $R^1$ and $R^2$ are together a —$(CH_2)_a$— group, wherein a is 3, 4, 5 or 6 and form, together with the nitrogen atom, a 4-, 5-, 6- or 7-membered non-aromatic ring to which, via adjacent ring carbon atoms, optionally one or more aromatic or heteroaromatic rings may be fused, and $R^3$ is $C_1$, $C_2$, $C_3$, $C_4$ or $C_5$ alkyl, more preferably N-methylpyrrolidinium or N-methylpiperidinium; or of the formula $[R_nAH]^+$, where preferably A is nitrogen, n is 3 and all R are identical and are $C_1$ to $C_3$ alkyl groups, more preferably trimethylammonium or triethylammonium.

In one or more embodiments, the anionic component is $[Y]^-$ which is an NCA, preferably of the formula $[B(R^4)_4]^-$, with $R^4$ being an aryl group or a substituted aryl group, of which the one or more substituents are identical or different and are selected from the group consisting of alkyl, aryl, a halogen atom, halogenated aryl, and haloalkylaryl groups, preferably perhalogenated aryl groups, more preferably perfluorinated aryl groups, and more preferably pentafluorophenyl, heptafluoronaphthyl or perfluorobiphenyl.

Preferably, the activator for use in any of the polymerization processes according to the present invention is trimethylammonium tetrakis(pentafluorophenyl)borate, N-methylpyrrolidinium tetrakis(pentafluorophenyl)borate, trimethylammonium tetrakis(heptafluoronaphthyl)borate, or N-methylpyrrolidinium tetrakis(heptafluoronaphthyl)borate. The metallocene is preferably rac-dimethylsilyl bis(indenyl) zirconium dichloride or -dimethyl, rac-dimethylsilyl bis(indenyl)hafnium dichloride or -dimethyl, rac-ethylnyl bis(indenyl)zirconium dichloride or -dimethyl or rac-ethylnyl bis(indenyl)hafnium dichloride or -dimethyl.

Any catalyst system resulting from any combination of the preferred metallocene compound, preferred cationic component of the activator and preferred anionic component of the activator mentioned in the preceding paragraphs shall be explicitly disclosed and may be used in accordance with the polymerization of one or more olefin monomers. Also, combinations of two different activators can be used with the same or different metallocene(s).

Scavengers or Additional Activators

The catalyst system may contain, in addition to the transition metal compound and the activator described above, additional activators or scavengers. A co-activator is a compound capable of alkylating the transition metal complex, such that when used in combination with an activator, an active catalyst is formed. Co-activators include alumoxanes and aluminum alkyls. An alumoxane is preferably an oligomeric aluminum compound represented by the general formula $(R^x—Al—O)_n$, which is a cyclic compound, or $R^x(R^x—Al—O)_nAlR^x_2$, which is a linear compound. Common alumoxanes are a mixture of cyclic and linear compounds. In the general alumoxane formula, $R^x$ is independently a $C_1-C_{20}$ alkyl radical, for example, methyl, ethyl, propyl, butyl, pentyl, isomers thereof, and the like, and "n" is an integer from 1-50. More preferably, $R^x$ is methyl and "n" is at least 4. Methyl alumoxane (MAO) as well as modified MAO, referred to herein as MMAO, containing some higher alkyl groups to improve the solubility, ethyl alumoxane, iso-butyl alumoxane and the like are useful herein. Particularly useful MAO can be purchased from Albemarle in a 10 wt. % solution in toluene. Co-activators are typically only used in combination with Lewis acid activators and ionic activators when the pre-catalyst is not a dihydrocarbyl or dihydride complex.

In some embodiments, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1-C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$) and the like. More preferred aluminum alkyls include triethylaluminum, diethylaluminum chloride, ethylaluminium dichloride, tri-iso-butylaluminum, tri-n-octylaluminum, tri-n-hexylaluminum, trimethylaluminum and combinations thereof. Preferred boron alkyls include triethylboron. Scavenging compounds may also be alumoxanes and modified alumoxanes including methylalumoxane and modified methylalumoxane.

The catalyst systems of the present invention can be prepared and supported according to methods known in the art. In particular, methods for preparing the catalyst systems described herein, as well as suitable supports and methods for supporting the catalyst systems are described in detail in U.S. Publication No. 2010/0029873, which is incorporated by reference herein in its entirety.

Polymerization Processes

The process for polymerizing ethylene and propylene may comprise contacting ethylene and propylene under polymerization conditions with a catalyst system comprising an activator of formula (1) or formula (2) as defined above.

In particular, the polymerization processes exclude the use of or are substantially free from the use of a chain shuttling agent during polymerization. Known shuttling agents include, but are not limited to, diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide), n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc(2,6-diphenylphenoxide), and ethylzinc(t-butoxide). By "exclude the use of" and "substantially free of" is meant that, while there is the potential that small amounts of chain shuttling agent may be present as an impurity in the polymerization process, no chain shuttling agent is deliberately added to the reactor or reactors before or during the polymerization process. In one or more embodiments, the concentration of shuttling agent is less than about 1000 ppm, or less than about 750 ppm, or less than about 500 ppm, or less than about 250 ppm, or less than about 100 ppm.

The catalyst systems described above are suitable for use in a solution, bulk, gas or slurry polymerization process or a combination thereof, preferably solution phase or bulk phase polymerization process. Preferably, the process is a continuous process. By "continuous", it is meant a system that operates without interruption or cessation. For example, a continuous process to produce a polymer would be one where the reactants are continually introduced into one or more reactors and polymer product is continually withdrawn.

One or more reactors in series or in parallel may be used. Catalyst precursor and activator may be delivered as a solution or slurry, either separately to the reactor, activated in-line just prior to the reactor, or preactivated and pumped as an activated solution or slurry to the reactor. A preferred operation is two solutions, for example, one catalyst precursor solution and one activator solution, activated in-line. Methods to introduce multiple catalysts into reactors are further described in U.S. Pat. No. 6,399,722, and PCT Publication No. WO 01/30862A1. While these references may emphasize gas phase reactors, the techniques described are equally applicable to other types of reactors, including continuous stirred tank reactors, slurry loop reactors and the like. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst compounds can be added to the first reactor in the series. The catalyst component may also be added to both reactors, with one component being added to first reaction and another component to other reactors.

Preferably, the polymerization processes using activators of formula (1) or (2) in combination with a transition metal compound, preferably a metallocene, are solution processes, where polymerization is conducted at a temperature of at least about 50° C., or at least about 60° C., or at least about 70° C., or at least about 80° C., or at least about 90° C.

Preferably, the polymerization processes using activators of formula (1) and/or (2) in combination with a metallocene as described above are run with a monomer conversion of from 5 to 95%, or from 5 to 90%, or from 5 to 85%, or from 5 to 80%, or from 5 to 75%, or from 5 to 70%, all percentages based on a theoretically possible 100% conversion. The conversion is calculated on a weight basis (the actual amount (weight in gram) polymer obtained, divided through the theoretically possible amount (again weight in gram) of polymer if all monomer was converted into polymer). As an example, as propylene has a density of 0.52 g/mL, if 100 mL propylene monomer is fed into the reactor, theoretically 52 g polypropylene could be obtained (assuming a theoretical 100% conversion). The % conversion achieved in a particular polypropylene reaction run with 100 mL of propylene feed is therefore calculated as follows: conversion [%]=(actual weight (g) polypropylene recovered/52 g)×100%. So, for example, if 5.2 g of polymer is recovered, the conversion would be 10%.

Applications and End-Uses

The polymers produced by the processes described herein are useful in making a wide variety of products and useful in many end-use applications.

Polymers produced by the process described herein may be useful in such forming operations as film, sheet, and fiber extrusion and co-extrusion as well as blow molding, injection molding, and rotary molding. Films include blown or cast films formed by coextrusion or by lamination, shrink film, cling film, stretch film, sealing films, and oriented films. The films are useful in snack packaging, heavy duty bags, grocery sacks, baked and frozen food packaging, medical packaging, industrial liners, membranes, and many other applications, and may be used in food contact or non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers, toys, etc. Polymers with low molecular weight can also be used for adhesive applications, particularly for hot melt adhesives.

In some embodiments, the invention may be described with reference to the following lettered paragraphs:

A. A copolymer comprising propylene and ethylene, wherein the copolymer comprises from about 50 to about 95 wt. % ethylene, the copolymer has a melting temperature greater than about 90° C., and more than about 5 wt. % of the copolymer, based upon the total weight of the copolymer, is soluble in xylene or ortho-dichlorobenzene.

B. The copolymer of paragraph A, wherein the copolymer comprises from about 65 to about 90 wt. % ethylene.

C. The copolymer of any of paragraphs A through B, wherein the copolymer has a melting temperature greater than about 100° C.

D. The copolymer of any of paragraphs A through C, wherein the melting temperature of the soluble fraction of the copolymer is greater than about 100° C.
E. The copolymer of any of paragraphs A through D, wherein the copolymer has a melting temperature at least about 20° C. greater than a random copolymer comprising propylene and ethylene in the same weight percentages.
F. The copolymer of any of paragraphs A through E, wherein the copolymer is prepared in the absence of a chain shuttling agent.
G. The copolymer of any of paragraphs A through F, wherein the melting temperature of the soluble fraction is at least about 20° C. greater than the melting temperature of the soluble fraction of a copolymer comprising propylene and ethylene in the same weight percentages but synthesized in the presence of a chain shuttling agent.
H. An article comprising the copolymer of any of paragraphs A through G.
I. A copolymer comprising propylene and ethylene, wherein the copolymer comprises from about 5 to about 25 wt. % ethylene, the copolymer has a melting temperature less than about 110° C., the copolymer has a heat of fusion less than about 65 J/g, and more than about 5 wt. % of the copolymer, based upon the total weight of the copolymer, is soluble in xylene or ortho-dichlorobenzene.
J. The copolymer of paragraph I, wherein the copolymer comprises from about 8 to about 20 wt. % ethylene.
K. The copolymer of any of paragraphs I through J, wherein the copolymer has a melting temperature less than about 105° C.
L. The copolymer of any of paragraphs I through K, wherein the copolymer has a heat of fusion less than about 60 J/g.
M. The copolymer of any of paragraphs I through L, wherein the copolymer has a melting temperature at least about 10° C. greater than a random copolymer comprising propylene and ethylene in the same weight percentages.
N. The copolymer of claim 9 any of paragraphs I through M, wherein the copolymer is prepared in the absence of a chain shuttling agent.
O. The copolymer of any of paragraphs I through N, wherein the melting temperature of the soluble fraction is at least about 10° C. greater than the melting temperature of the soluble fraction of a copolymer comprising propylene and ethylene in the same weight percentages but synthesized in the presence of a chain shuttling agent.
P. An article comprising the copolymer of any of paragraphs I through O.
Q. A process for preparing a copolymer comprising polymerizing propylene and ethylene in a solution process and in the presence of a catalyst system comprising a catalyst and an activator, wherein the catalyst comprises a metallocene compound, wherein the activator comprises a cationic component and an anionic component, wherein the cationic component of the activator corresponds to the formula:

[$R^1R^2R^3NH$]$^+$, where $R^1$ and $R^2$ are together a —$(CH_2)_a$— group, where a is 3, 4, 5, or 6 and $R^1$ and $R^2$ form a 4-, 5-, 6-, or 7-membered non-aromatic ring together with the nitrogen atom to which one or more aromatic or heteroaromatic rings may optionally be fused via adjacent ring carbon atoms, and $R^3$ is a $C_1$-$C_5$ alkyl group; or

[$R_3NH$]$^+$, where all R are identical and are $C_1$-$C_3$ alkyl groups, and wherein the anionic component of the activator corresponds to the formula

[$B(R^4)_4$], where $R^4$ is an aryl group or a substituted aryl group having one or more substituents, wherein the one or more substituents are identical or different and are selected from alkyl, aryl, halogenated aryl, or haloalkylaryl groups or a hydrogen atom.
R. The process of paragraph Q, wherein the copolymer is prepared in the absence of a chain shuttling agent.
S. The process of any of paragraphs Q through R, wherein the copolymer comprises from about 65 to about 90 wt. % ethylene.
T. The process of any of paragraphs Q through S, wherein the copolymer comprises from about 5 to about 25 wt. % ethylene.
U. The process of any of paragraphs Q through T, wherein more than about 5 wt. % of the copolymer, based upon the total weight of the copolymer, is soluble in xylene or ortho-dichlorobenzene.
V. The process of any of paragraphs Q through U, wherein the metallocene compound is a dialkylsilyl-bridged bis(indenyl) metallocene.
W. The process of any of paragraphs Q through V, wherein the cationic component of the activator is selected from N-methylpyrrolidinium, N-methylpiperidinium, trimethylammonium, or triethylammonium.
X. The process of any of paragraphs Q through W, wherein the anionic component of the activator is selected from tetrakis(pentafluorophenyl)borate or tetrakis(heptafluorophenyl)borate.
Y. A copolymer prepared according to the process of any of paragraphs Q through X.

EXAMPLES

Preparation and Properties of Ethylene-Rich Copolymers

Five ethylene-propylene copolymers were prepared using a catalyst system comprising a dimethylsilyl bis(indenyl) hafnium dimethyl catalyst and a trimethyl ammonium tetrakis(pentafluorophenyl) borate activator. The copolymers have ethylene contents between about 75 and about 85 wt. %. Inventive copolymers are identified in Table 1, below, as polymers 1 through 5. Five comparative copolymers, prepared using diethyl zinc, a chain shuttling agent, are also listed in Table 1 and are identified as polymers C1 through C5. Properties of the comparative polymers are taken from PCT Publication No. WO2009/012216 (Table 2). Representative properties for the inventive and comparative polymers, including ethylene contents, melting temperatures, and molecular weight data, are given in Table 1.

TABLE 1

| Sample No. | $C_2$, wt. % | Tm, ° C. (DSC) | Amorphous Fraction, % (TREF) | Second Peak, ° C. (TREF) | High T Peak, ° C. (TREF) | Mn, g/mol (GPC) | Mw, g/mol (GPC) | Mw/Mn, g/mol (GPC) |
|---|---|---|---|---|---|---|---|---|
| 1 | 77.1 | 114.4 | 57.1 | 77.6 | 81.7 | 8617 | 52572 | 6.10 |
| 2 | 81.9 | 117.8 | 29 | 74.5 | 88 | 14223 | 58027 | 4.08 |
| 3 | 75.6 | 115.6 | 62 | 76.2 | 87 | 21517 | 75976 | 3.50 |
| 4 | 80.4 | 117.1 | | | | 20775 | 61843 | 2.98 |
| 5 | 85.4 | 119.5 | | | | 25840 | 98553 | 3.81 |

TABLE 1-continued

| Sample No. | $C_2$, wt. % | Tm, °C. (DSC) | Amorphous Fraction, % (TREF) | Second Peak, °C. (TREF) | High T Peak, °C. (TREF) | Mn, g/mol (GPC) | Mw, g/mol (GPC) | Mw/Mn, g/mol (GPC) |
|---|---|---|---|---|---|---|---|---|
| C1 | 71.4 | 73.7 | | | | 70800 | 157600 | 2.2 |
| C2 | 71.5 | 38.8 | | | | 48040 | 92530 | 1.9 |
| C3 | 71.2 | 37.0 | | | | 66140 | 133700 | 2.0 |
| C4 | 69.0 | 42.0 | | | | 65770 | 153600 | 2.3 |
| C5 | 69.6 | 41.4 | | | | 63940 | 145800 | 2.3 |

Inventive polymer 2, having an ethylene content of 81.9 wt. %, was fractionated using ortho-dichlorobenzene (ODCB) according to the fractionation procedure described previously. Three fractions were obtained. Properties of each of the fractions are given in Table 2, below.

TABLE 2

| Fraction No. | Solvent Temp, °C. | Fraction (mass/g) | Wt. % | Cumulative Wt. % | $C_2$, Wt. % | Tm, °C. |
|---|---|---|---|---|---|---|
| 1 | 0.0 | 33.0 | 8.1 | 8.1 | 71.7 | 110.25 |
| 2 | 10.0 | 92.0 | 22.5 | 30.6 | 74.5 | 117.13 |
| 3 | 130.0 | 282.0 | 69.1 | 99.8 | 80.4 | 122.14 |

Figure 1:
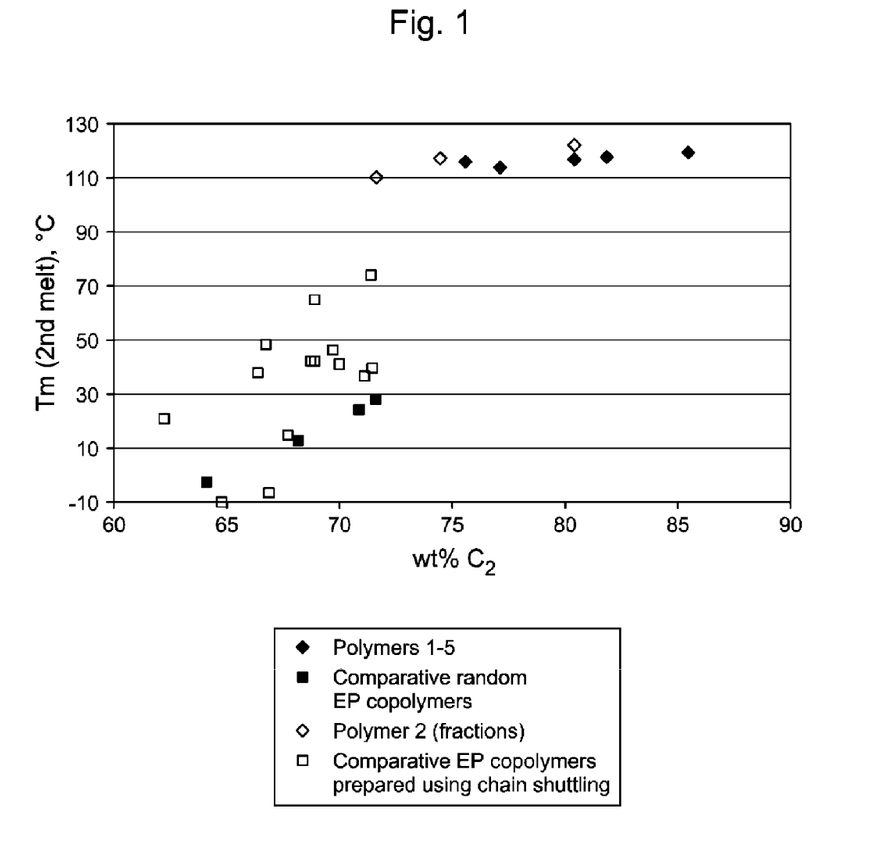
FIG. 1 shows melting temperature versus ethylene content for ethylene-rich EP copolymers of the invention, as well as for comparative ethylene-rich copolymers.

As shown in Table 2, all three fractions obtained from polymer 2 show at least one melting temperature above 110° C., which, when considered with the high $C_2$ content, indicates that all of the fractions comprise long ethylene sequences. These melting temperatures are at least about 20° C. higher than those of random ethylene-propylene copolymers having similar ethylene contents. Further, the melting temperatures are also at least about 20° C. higher than those of blocky ethylene-propylene copolymers prepared using a chain shuttling agent, as reported in PCT Publication No. WO2009/012216. These properties are illustrated graphically in FIG. 1, which shows melting temperature versus comonomer content for the polymers in Tables 1 and 2.

Preparation and Properties of Propylene-Rich Copolymers

Six propylene-ethylene copolymers were prepared using a catalyst system comprising a dimethylsilyl bis(indenyl) hafnium dimethyl catalyst and a trimethyl ammonium tetrakis(pentafluorophenyl) borate activator. The resulting inventive polymers have ethylene contents between about 4 and about 17.5 wt. %. Those inventive copolymers are identified in Table 3, below, as polymers 6 through 11. Six comparative copolymers, prepared using a catalyst system comprising a dimethylsilyl bis(indenyl)hafnium dimethyl catalyst and a dimethyl anilinium tetrakis(pentafluorophenyl) borate activator, are also listed in Table 3 and are identified as polymers C6 through C11. Representative properties for the inventive and comparative polymers, including ethylene contents and melting temperatures, are given in Table 3.

TABLE 3

| Sample No. | Tm, °C. | Tc, °C. | Hf, J/g | $C_2$, wt. % |
|---|---|---|---|---|
| 6 | 102.13 | 62.15 | 57.80 | 4.17 |
| 7 | 84.16 | 35.49 | 38.53 | 7.35 |
| 8 | 71.99 | 15.54 | 29.92 | 13.22 |
| 9 | 60.66 | 12.72 | 12.70 | 11.89 |
| 10 | 59.78 | 28.45 | 2.10 | 15.77 |
| 11 | amorphous | amorphous | | 17.43 |
| C6 | 102.02 | 60.88 | 54.44 | 2.8 |
| C7 | 84.61 | 39.39 | 41.88 | 5.0 |
| C8 | 72.45 | 20.85 | 31.32 | 7.8 |

TABLE 3-continued

| Sample No. | Tm, °C. | Tc, °C. | Hf, J/g | $C_2$, wt. % |
|---|---|---|---|---|
| C9 | 60.59 | 15.83 | 14.41 | 8.4 |
| C10 | amorphous | amorphous | | 16 |
| C11 | amorphous | amorphous | | 20 |

Figure 2:
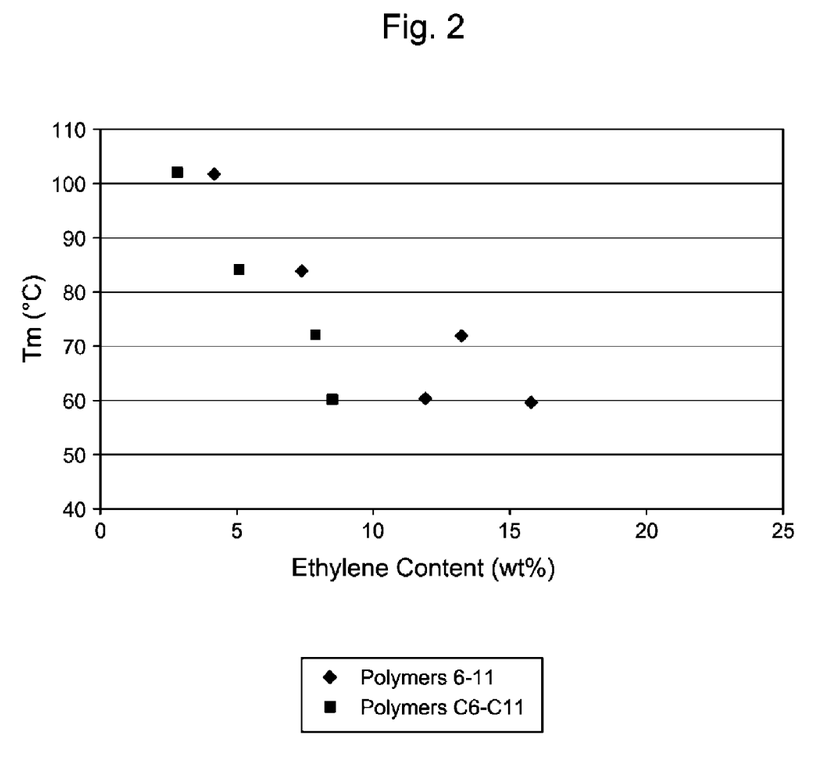
FIG. 2 shows melting temperature versus ethylene content for propylene-rich EP copolymers of the invention, as well as for comparative propylene-rich copolymers.

As shown in Table 3, the melting temperatures of the inventive polymers are higher than those of comparative polymers having a similar comonomer content. These characteristics are illustrated graphically in FIG. 2, which shows melting temperature versus comonomer content for the polymers in Table 3.

Certain embodiments and features have been described herein using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, any patents, test procedures, or other documents cited in this application are fully incorporated by reference to the extent such disclosure is not inconsistent with this application and for all jurisdictions in which such incorporation is permitted.

As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A process for preparing an ethylene-propylene copolymer comprising:
   polymerizing propylene and ethylene in a solution process and in the presence of a catalyst system comprising a catalyst and an activator;
   a. wherein the catalyst comprises a metallocene compound;
   b. wherein the activator comprises a cationic component and an anionic component;
   c. wherein the cationic component of the activator corresponds to the formula:
      i. $[R^1R^2R^3NH]^+$, where $R^1$ and $R^2$ are together a —$(CH_2)_a$— group, where a is 3, 4, 5, or 6 and $R^1$ and $R^2$ form a 4-, 5-, 6-, or 7-membered non-aromatic ring together with the nitrogen atom to which one or more aromatic or heteroaromatic rings may optionally be fused via adjacent ring carbon atoms; and $R^3$ is a $C_1$-$C_5$ alkyl group; or ii. $[R_3NH]^+$, where all R are identical and are $C_1$-$C_3$ alkyl groups; and d. wherein the anionic component of the activator corresponds to the formula $[B(R^4)_4]^-$, where $R^4$ is an aryl group or a substituted aryl group having one or more substituents, wherein the one or more substituents are identical or different and are selected from alkyl, aryl, halogenated aryl, or haloalkylaryl groups or a hydrogen atom;

wherein the ethylene-propylene copolymer comprises from about 65 wt % to about 90 wt % ethylene-derived units, based on the weight of the ethylene-propylene copolymer; and wherein the ethylene-propylene copolymer has a melting temperature of from about 95° C. to about 200° C.

2. The process of claim 1, wherein the copolymer is prepared in the absence of a chain shuttling agent.

3. The process of claim 1, wherein the copolymer comprises from about 75 wt % to about 85 wt % ethylene-derived units.

4. The process of claim 1, wherein the metallocene compound is a dialkylsilyl-bridged bis(indenyl) metallocene.

5. The process of claim 1, wherein the cationic component of the activator is selected from N-methylpyrrolidinium, N-methylpiperidinium, trimethylammonium, or triethylammonium.

6. The process of claim 1, wherein the anionic component of the activator is selected from tetrakis(pentafluorophenyl)borate or tetrakis(heptafluoronaphthyl)borate.

* * * * *